United States Patent [19]
Hall

[11] 3,761,162
[45] Sept. 25, 1973

[54] MULTIPLE PURPOSE FIELD INCREASING OPTICAL DEVICE

[76] Inventor: Jon Hall, 22350 Pacific Coast Hwy., Malibu, Calif. 90265

[22] Filed: Oct. 12, 1971

[21] Appl. No.: 188,138

[52] U.S. Cl............ 350/255, 350/58, 350/181, 350/257
[51] Int. Cl. ............................................. G02b 7/04
[58] Field of Search............... 350/181, 255, 257, 350/78, 79, 58

[56] References Cited
UNITED STATES PATENTS

| | | | |
|---|---|---|---|
| 1,880,635 | 10/1932 | Wollensak | 350/255 |
| 2,997,920 | 8/1961 | Jacobsen | 350/181 |
| 2,969,008 | 1/1961 | Ferrari et al. | 350/255 |
| 2,685,237 | 8/1954 | Dearstyne | 350/257 UX |
| 2,940,372 | 6/1960 | Ehrenhaft et al. | 350/255 X |
| 1,482,893 | 2/1924 | Hart | 350/255 |
| 1,848,402 | 3/1932 | Wollensak | 350/255 |

Primary Examiner—David H. Rubin
Attorney—William C. Babcock

[57] ABSTRACT

A multiple purpose optical device that may be selectively and removably attached to engageable means on either the forward portion of a camera housing containing shutter means and a light sensitive film or engageable means on the forward portion of a projector containing a light source and a holder for said film after the film has been exposed and developed.

The device when mounted on a camera as above described laterally compresses the light image to which the film is exposed and increases the field of said camera as a result thereof. The device when mounted on said projector laterally expands the developed image on the film as said developed image is reproduced, with the compression and expansion being to such a degree as to nullify one another and provide a non-distorted and natural reproduction of said developed image on a projection receiving surface.

7 Claims, 6 Drawing Figures

PATENTED SEP 25 1973

INVENTOR.
JON HALL
BY
William G. Babcock
ATTORNEY

INVENTOR.
JON HALL
BY
William G. Babcock
ATTORNEY

MULTIPLE PURPOSE FIELD INCREASING OPTICAL DEVICE

BACKGROUND OF THE INVENTION

1. Field of the Invention

Multiple purpose field increasing optical device.

2. Description of the Prior Art

In amateur photography it is desirable in most instances to have the field of the camera as wide as possible and still take a sharp well defined picture. Various innovations have been proposed and used to obtain this objective such as the development of the Super 8 film to replace the standard 8 millimeter film.

The purpose of the present invention is to further continue such development by compressing the image to which the film is exposed in a ratio of between 2:1 and 1.5:1, and then laterally expanding the image at the time of viewing to the same degree to obtain a non-distorted natural picture.

SUMMARY OF THE INVENTION

An optical device that includes first and second coaxially aligned tubular members adjustably connected for longitudinal movement relative to one another by an internally threaded cylindrical shell. The first tubular member contains a primary lens system and the second tubular member an an amorphic or cylindrical lens system that will cause a lateral compression of a viewed image in a ratio of between 2:1 and 1.5:1.

The rearward end of the first tubular member is provided with engaging means that may be used to selectively and removably mount the device on the forward portion of a camera or projector that is provided with suitable engageable means. The forward end of the second tubular member is closed by an opaque wall in which an oval aperture is formed that has the major vertical axis thereof longitudinally aligned with the major vertical axis of the anamorphic lens. Means are provided between the first and second tubular members to prevent rotation of the second member when the connecting shell is turned to focus the lens. The opaque wall preferably has a light shield projecting forwardly from the periphery thereof.

DESCRIPTION OF THE PREFERRED EMBODIMENT

Figure 1:
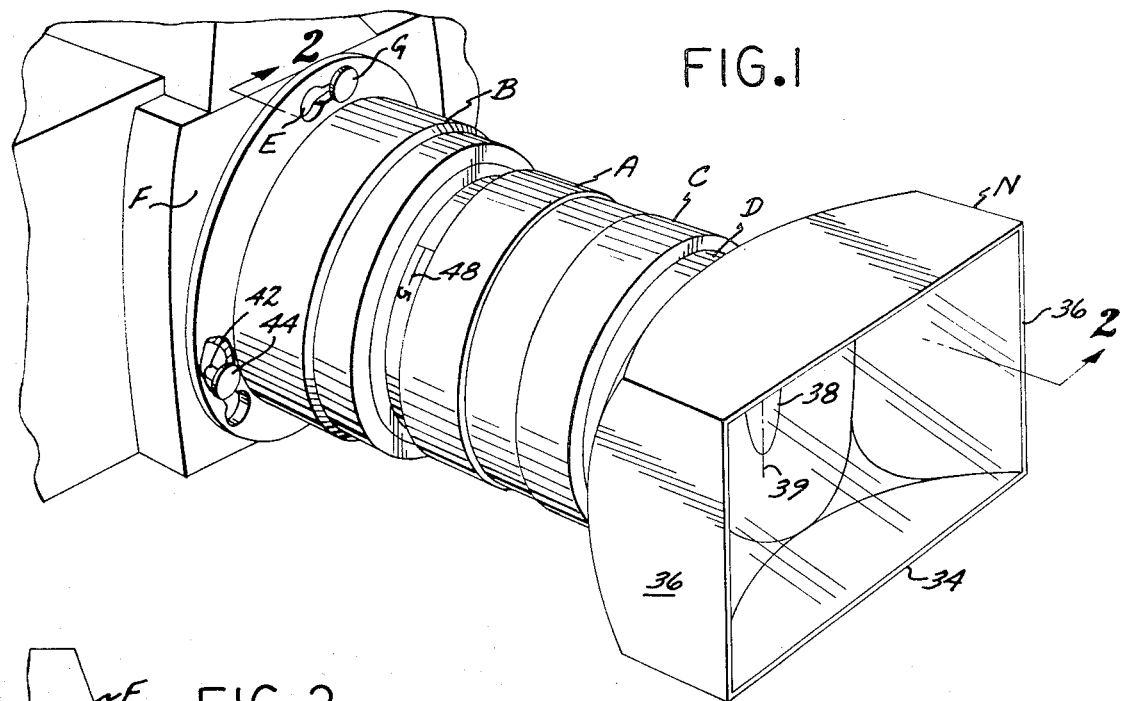
FIG. 1 is a perspective view of the device removably mounted on a camera housing containing a shutter mechanism and a conventional film holding mechanism.
Figure 2:
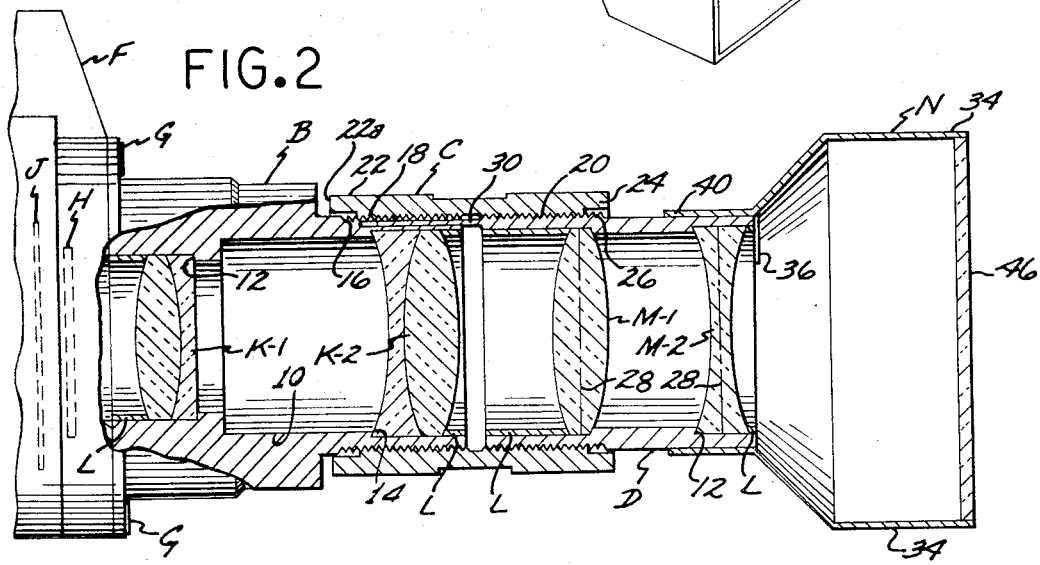
FIG. 2 is a longitudinal cross sectional view of the device taken on the line 2—2 of FIG. 1.
Figure 3:
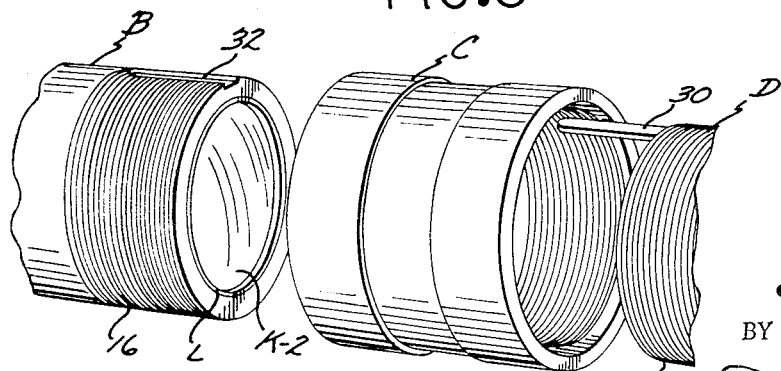
FIG. 3 is a fragmentary exploded perspective view of the forward portion of the first tubular member, the connecting cylindrical shell, and the rearward portion of the second tubular member.

The optical device A as may best be seen in FIGS. 1-3 inclusive is defined by a first tubular member B that is longitudinally aligned with a cylindrical shell C and second tubular member D. The shell C serves the dual function of connecting the tubular members B and D, and by rotating the shell causing the second tubular member D to move longitudinally relative to first tubular member B.

Engaging means E are provided on the rearward end portion of first tubular member B, and these engaging means permitting the device A to be selectively and removably mounted on the front portion of a camera housing F or projector P that are each provided with engageable means G.

The camera housing F has a conventional shutter mechanism H in the interior thereof and a light sensitive film J. The film J is supported within the camera housing F by conventional means (not shown). The device A is particularly adapted for use with a 35 millimeter still camera, or a camera that uses Super 8 or 16 millimeter motion picture film.

The film tubular member B has an elongate bore 10 extending longitudinally that defines spaced body shoulder 12 and 14 that serve as stops against which first and second primary lens assemblies K-1 and K-2 abut. The lens assemblies K-1 and K-2 are removably held in bore 10 by resilient rings L that frictionally engage the bore 10, and contact the lens assemblies K-1 and K-2 on the peripheral sides thereof opposite those that are in abutting contact with body shoulders 12 and 14. The rearward portion of first tubular member B is preferably of enlarged diameter as shown in FIG. 2, and supports an outwardly extending flange in which the engaging means E are defined.

The forward external surface of first tubular member B has first threads 16 of a first direction formed thereon. The cylindrical shell C has first threads 18 of a first direction formed in the rearward interior thereof and second threads 20 of a second direction formed on the forward interior surface thereof. Cylindrical lips 22 and 24 extend rearwardly and forwardly from shell C, with the interior diameter of the lips being slightly greater than the external diameters of threads 18 and 20. The second tubular member D has threads 26 of a second direction formed on the rearward external surface thereof, with the threads 16 and 18, and threads 20 and 26 being in engagement as may best be seen in FIG. 2. It will be particularly noted in FIG. 2 that the lips 22 and 24 extend over the threads 16 and 26 to prevent the latter from being damaged due to inadvertent contact with a hard object. The second tubular member D has anamorphic lens assembly M-1 and M-2 disposed therein, that have elongate major axis 28 which when the device A is being used must be maintained in vertical positions. The anamorphic lens M-1 and M-2 are maintained in fixed positions within the second tubular member D by rings L and body shoulders 12 in the same manner as described in connection with the first tubular member B. The second tubular member D has a bayonet 30 projecting rearwardly from the peripheral portion thereof that extends over the threads 18 and 20 as shown in FIG. 2 to slidably engage a longitudinally extending slot 32 formed in the outer forward portion of the first tubular member B as illustrated in FIG. 3. Due to the cooperation of the bayonet 30 and slot 32, the second tubular member D does not turn when the shell C is rotated, but merely moves longitudinally in either a forward or rearward direction when such rotation of the shell takes place. Due to the non-rotational movement of the second tubular member D when shell C is turned, the axis 28 at all times may be maintained in a vertical plane.

A light shield N preferably in the form of a rectangular box having side walls 34 and end walls 36 is provided and with the rearward part of the box including a transverse wall 36 in which a vertically disposed oval aperture 38 is defined. The major axis 39 of the aperture 38 is vertically aligned with the axis 28 when the light shield N is mounted on the forward extremity of the second tubular member D as shown in FIG. 2. The light shield N is conveniently held in a mounted position on the second tubular member D by a cylindrical shell 40 that extends rearwardly from the wall 36 and is secured to the forward external surface of the tubular member D.

The engageable means E are preferably keyhole shaped openings formed in the flange as may best be seen in FIG. 1 and circumferentially spaced from one another. The engageable means G are pins 42 that have heads 44 on the forward ends thereof, which pins can be extended through the openings E and then by a slight rotation of the optical device A, the optical device may be removably and rapidly secured to the forward portion of the camera housing F as illustrated in FIGS. 1 and 2. The positioning of the openings E is such that when the optical device A is rotated to be in a locked position on the camera housing F, the axis 39 is vertically disposed. When the optical device A is mounted on the camera housing F as shown in FIGS. 1 and 2, the shutter H may be actuated to expose the film J to a desired view, with the anamorphic lens M-1 and M-2 serving to laterally compress the light image to which the film J is exposed, and as a result increasing the field of the camera.

Figure 4:
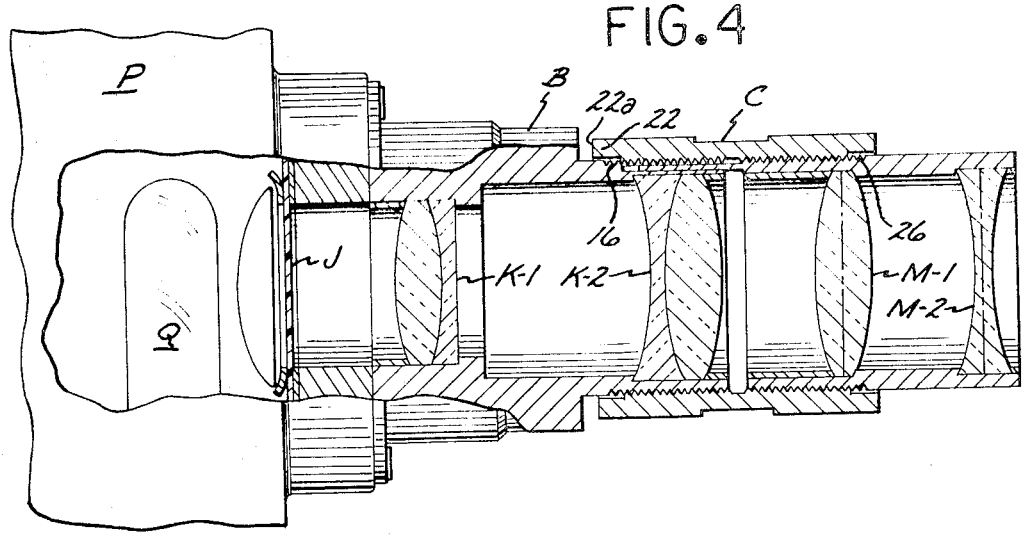
FIG. 4 is a longitudinal cross sectional view of the device removably mounted on a projector containing a film holder and a source of light.
Figure 5:
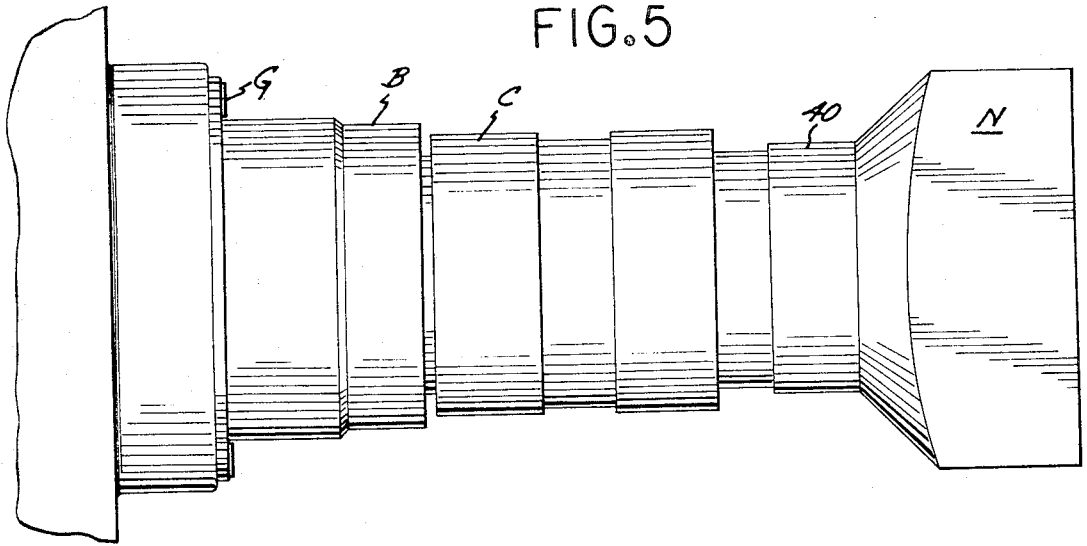
FIG. 5 is a side elevational view of the device mounted on a projector.

A projector P is provided as shown in FIG. 4 and 5 that includes a source of light Q and a condensing lens R and conventional means for supporting the exposed and developed film J.

Figure 6:
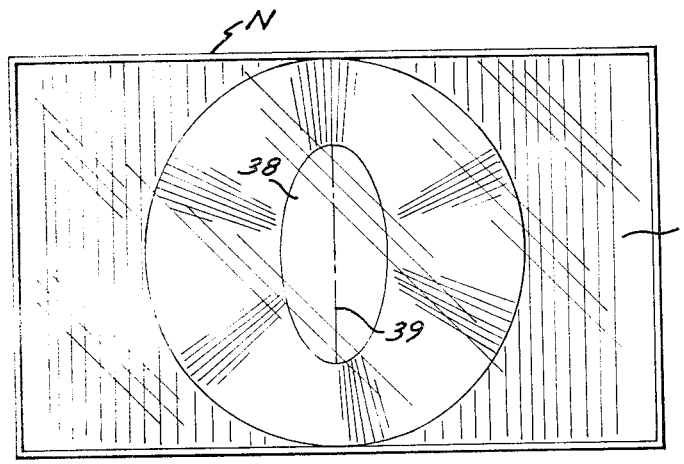
FIG. 6 is a front elevational view of the device.

The projector P is provided with engageable means G to permit the optical device A to be mounted on the forward portion of the projector as shown in FIGS. 4 and 5 and with the image (not shown) on the film J being laterally expanded due to the anamorphic lens M-1 and M-2 as it is reproduced on a desired surface such as a screen or the like. The expansion of the reproduced image by the projector P is to the same degree as the image was compressed on the film J, and as a result the compression and expansion nullify one another with the image being defined on the projection receiving surface (not shown) in a non-distorted natural condition. The wall 36 as may be seen in FIG. 6, preferably has an inwardly and rearwardly extending tapered surface surrounding the aperture 38 to allow an image of substantial width to be light impressed onto the film J when the latter is exposed. If desired the forward portion of the light housing N may be closed by a flat transparent sheet member 46. The external surface of the first tubular member B has graduations 48 formed thereon, and the rearward edge 22a of the lip 22 cooperating therewith to visually indicate the degree of focusing between the primary lens K-1 and K-2 and the anamorphic lens M-1 and M-2.

I claim:

1. A multiple purpose optical device that may be selectively and removably attached to engageable means on the forward portion of a camera housing containing shutter means and a light sensitive film or corresponding engageable means on the forward portion of a projector, which projector contains a source of light and a holder for said film after it has been exposed and developed, said device when mounted on said camera laterally compressing the light image to which said film is exposed and increasing the field of said camera as a result thereof, and said device when mounted on said projector laterally expanding the developed image on said film as said developed image is reproduced, with said compression and expansion being to such a degree as to nullify one another and provide a non-distorted and natural reproduction of said developed image on a projection receiving surface, said device comprising:

a. a first tubular member having forward and rearward ends, said tubular member having first threads of a first direction defined on the external surface thereof adjacent said forward end;
 b. primary lens means mounted in said first tubular member;
 c. engaging means on said rearward end for selectively engaging said engageable means to hold said first tubular member on either said camera or said projector;
 d. a second tubular member having forward and rearward ends that are coaxially aligned with said first member and disposed forwardly therefrom, said second member having second threads of a second direction formed on the external surface thereof adjacent said rearward ends;
 e. anamorphic lens means in said second member, said anamorphic lens means having a major axis that must be vertically disposed when said camera and projector are used for taking and reproducing pictures;
 f. a tubular rigid shell that has first and second threads of first and second directons on the interior surface thereof that engage said first and second threads on said first and second tubular members, said shell serving not only as a connector to hold said first and second tubular members in coaxial alignment, but said shell when rotated relative to both said first and second tubular members longitudinally moving said second tubular member relative to said first tubular member for focusing said primary and anamorphic lens means; and
 g. guide means interconnecting said first and second tubular members for preventing rotation of said second tubular member when said shell is rotated to focus said primary and anamorphic lens.

2. A device as defined in claim 1 in which said guide means is a bayonet that extends rearwardly from said second tubular member and slidably engages a longitudinally extending slot formed in the forward portion of said first tubular member;

3. A device as defined in claim 1 which in addition includes: (h) an opaque wall that closes the forward end of said second tubular member, said wall having an elongate oval-shaped aperture formed therein, and with the major axis of said aperture being longitudinally aligned with the major axis of said anamorphic lens;

4. A device as defined in claim 3 in which said wall projects outwardly beyond the periphery of said second tubular member, and said device in addition including a light shield open at the forward end, which light shield projects forwardly from the outer extremities of said wall;

5. A device as defined in claim 4 in which said wall is recessed to taper inwardly and rearwardly about said aperture;

6. A device as defined in claim 1, which in addition includes: (h) a flange that extends outwardly from the rearward end of said first tubular member and said flange having said engaging means defined thereon.

7. A device as defined in claim 6 in which said engageable means are a plurality of circumferentially-spaced pins that extend forwardly from said camera and said projector, and said engaging means are a plurality of slots formed in said flange that may removably engage said pins on either said camera or said projector to selectively support said device therefrom.

* * * * *